April 18, 1967 H. RICHERT ETAL 3,314,753
PROCESS FOR THE DECOMPOSITION OF PHOSGENE
Filed Oct. 21, 1964
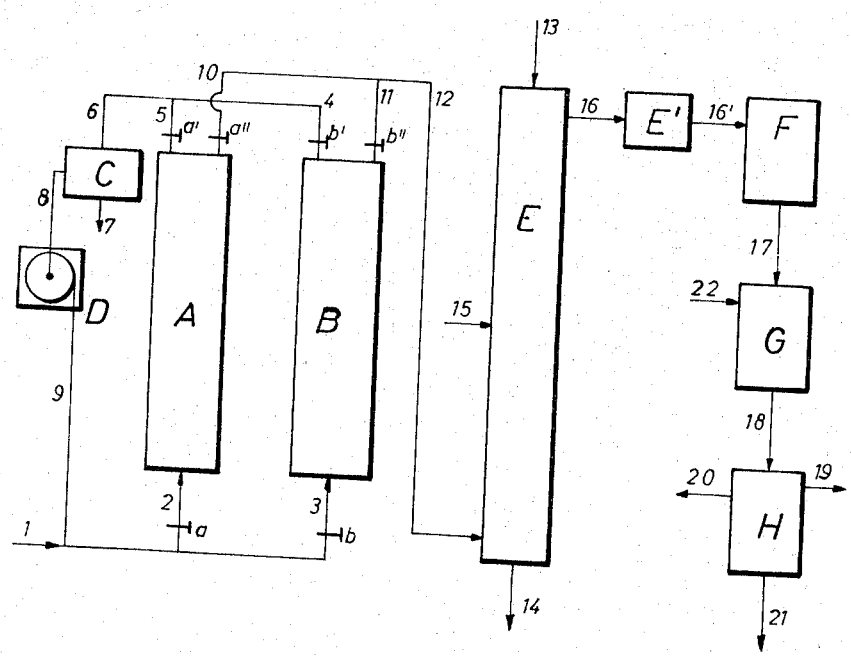
INVENTORS:
HANS RICHERT, EBERHARD ZIRNGIEBL,
BY
ATTORNEYS

# United States Patent Office 3,314,753
Patented Apr. 18, 1967

3,314,753
PROCESS FOR THE DECOMPOSITION OF PHOSGENE
Hans Richert, Leverkusen-Schlebusch, and Eberhard Zirngiebl, Cologne-Flittard, Germany, assignors to Farbenfabriken Bayer Aktiengesellschaft, Leverkusen, Germany, a German corporation
Filed Oct. 21, 1964, Ser. No. 405,524
Claims priority, application Germany, Oct. 25, 1963, F 41,095
3 Claims. (Cl. 23—154)

This invention relates to a process of decomposing phosgene to produce hydrochloric acid and carbon dioxide.

It is known to produce hydrogen chloride and carbon dioxide from phosgene by reacting water with phosgene in the presence of activated carbon. Thus, it has been proposed in U.S. Patent 2,832,670 to decompose phosgene by intimately contacting it with activated carbon and water. It is taught that water must be used in such proportions to the quantity of phosgene to be decomposed that the concentration of the hydrochloric acid does not exceed 10%. In other words, at least 7.5 parts of water must be used per part of phosgene and the low concentration acid produced must be neutralized and discarded with 9 times its weight of water. It is stated in the patent that a high concentration of hydrochloric acid prevents the complete hydrolysis of phosgene.

In the production of isocyanates by phosgenating amines, large quantities of waste gases which contain principally hydrogen chloride, phosgene and inert gases are formed. It is necessary to decompose the phosgene because of its highly poisonous property. In the old process for decomposing phosgene, large amounts of waste water and low concentration acid are produced and seriously add to the expense of the process. Moreover, the dilute hydrochloric acid produced is valueless.

It is therefore an object of this invention to provide an improved process for the decomposition of phosgene. Another object of this invention is to provide an improved process for the decomposition of phosgene which simultaneously produces valuable concentrated hydrochloric acid. Still a further object of this invention is to provide a process for the decomposition of phosgene which avoids the use of large quantities of waste water. Another object of this invention is to provide a process for the decomposition of phosgene which provides for better utilization of the activated carbon catalyst.

The foregoing objects and others which will become apparent from the following description are accomplished in accordance with this invention, generally speaking, by providing for the decomposition of phosgene by contacting it with water in the presence of activated carbon in the vapor phase at a temperature above the dew point of the mixture of water and phosgene. A preferred embodiment of the invention involves decomposing the phosgene which is mixed with hydrogen chloride and other waste gases including inert organic solvents resulting e.g. as by-products in the production of organic polyisocyanates by the phosgenation of amines. This process involves working up waste gases which contain hydrogen chloride and which may also contain other impurities in addition to phosgene and inert gases, which comprises adiabatically absorbing the hydrogen chloride and hydrolyzing the phosgene on active carbon, wherein, possibly after an active carbon absorption, the hydrogen chloride is first of all removed from the waste gas by adiabatic absorption with water and/or dilute hydrochloric acid, concentrated hydrochloric acid being formed, and thereafter the gas mixture still containing substantially phosgene and steam (possibly after adding more steam) is conducted at temperatures above the dew point of the mixture over active carbon, whereby a molar ratio of water:phosgene of at least 1:1, preferably of between 5:1 and 20:1 is adjusted, the hydrogen chloride thereby formed is condensed and the hydrochloric acid is recovered by separation from the residual constituents of the gas mixture.

The hydrochloric acid recovered in the second stage of the process can advantageously be used again in the adiabatic absorption of the hydrogen chloride.

It was found that a crude gas containing phosgene can be worked up in simple manner to give concentrated pure hydrochloric acid without the formation of waste water and with complete detoxication (removal of phosgene) of the waste gases formed if it is first of all subjected to an adiabatic absorption of the hydrogen chloride in such a quantity of water and/or dilute (up to 20%) aqueous hydrochloric acid that concentrated and advantageously 30% hydrochloric acid is formed. Thereafter, the gas mixture which is recovered and which consists essentially of steam and phosgene as well as hydrogen chloride and impurities, is conducted directly or, in the case of high phosgene contents in the crude gas (ratio by volume between hydrogen chloride and phosgene, smaller than 4:1) after adding such a quantity of steam that the molar ratio between the total quantity of the steam and the phosgene content in the crude gas is at least 1:1 (1:1 to 100:1) and preferably of between 5:1 and 20:1, at a temperature above its dew point over active carbon. The quantity of catalyst used depends on the nature of the active carbon; for example, when using a gas activated granulated carbon based on coal, only about half as much of this is required as of an active coal activated with zinc chloride solution. In each case, the quantity of active carbon in this process is only a fraction of the quantity of active carbon required for destroying the phosgene when using liquid water; thus, for example, with an active coal activated with zinc chloride solution, an amount of about one tenth of the quantity of that required with cold water according to U.S. Patent 2,832,670 is necessary. The phosgene is quantitatively reacted on the active carbon to give hydrogen chloride and carbon dioxide with the evolution of heat with the steam. This step of the process can therefore also be used as such for destroying phosgene. The hydrogen chloride formed by the hydrolysis is condensed with the unreacted steam or, with high phosgene contents in the crude gas, with additionally injected water, in a gas condenser as hydrochloric acid and separated from the remaining gases in a separator. The quantity of the water which may be additionally injected into the condenser is advantageously such that the hydrochloric acid which is formed is 20 to 30%. This hydrochloric acid obtained from the hydrolysis of the phosgene is either used as such or returned at a suitable point into the adiabatically operated absorption tower. The advantages of this process over the hitherto usual working method are the following:

(1) Only a fraction of the quantity of active carbon is used as compared with the hitherto usual processes for destroying phosgene with cold (i.e. liquid) water.

(2) At high phosgene-removing temperatures of more than about 120° C. the adsorption capacity of the active carbon is greatly lowered, so that an effect of the adsorbable organic and inorganic substances for disturbing the de-phosgenation does not occur, even with relatively high concentration of these compounds.

(3) The hydrochloric acid obtained from the decomposition of phosgene is recovered with sufficiently high phosgene contents of the crude gas as concentrated acid, which can be immediately exploited industrially and which does not have to be destroyed as waste water, whereas the acid recovered according to U.S. Patent 2,832,670 is a maximum of only 10%. In order that the large quantities of hydrogen chloride formed with very high phosgene concentrations may be completely precipitated as concentrated acid, corresponding quantities of water are injected into the gas condenser.

(4) If the hydrochloric acid obtained from the decomposition of phosgene is contaminated with organic constituents of the crude gas which are volatile in steam and only sparingly soluble in aqueous hydrochloric acid (for example, with chlorinated benzenes or carbon tetrachloride), this acid, after separation of the undissolved impurities, can be worked up to pure acid by return to the adiabatic absorption. Both the concentrated acid and the dilute acid (with simultaneous conversion into concentrated acid) can be subjected to this purification, so that thereby all waste waters are eliminated in a simple manner and in place thereof valuable concentrated hydrochloric acid of high purity is recovered.

If the crude gas to be purified contains relatively high proportions of organic and/or inorganic gaseous impurities which can be adsorbed on active carbon, it is advantageous to treat the crude gas above its dew point and before the adiabatic absorption of the hydrogen chloride with dry active carbon whereby the adsorbable substances are removed. The active carbon of the phosgene-destroying stage is thereby protected from an additional loading, due to possibly disturbing impurities, and simultaneously a very pure acid which satisfies even high standards as regards purity is recovered in the following gas condenser.

For example, when recovering phosgene from hydrogen chloride gases in the preparation of isocyanates, chlorinated benzenes are used as selective solvents, and these can additionally contaminate the crude gases which are to be worked up. However, other solvents such as benzene, nitrobenzene, carbon tetrachloride, tetrachloroethylene and hexachloroethane are also concerned. The hydrogen chloride-phosgene waste gas to be worked up from other processes can also contain compounds which are volatile in steam and soluble in aqueous hydrochloric acid or even react with aqueous hydrochloric acid to form products with the said properties. Such compounds, for example, acetyl chloride, benzoyl chloride, phosphorous-oxychloride, silicon tetrachloride and sulphuryl chloride would contaminated the hydrochloric acid to be recovered in an undesirable manner if they were not previously adsorbed on active carbon during the adiabatic absorption of the hydrogen chloride.

Spent active carbon from the preceding adsorption purification of the crude gas can advantageously be treated at high temperature with crude gas as regeneration gas. The regenerated gas is then conducted through a gas condenser, in which the adsorbed substances are recovered and thereafter recombined with the main stream of the crude gas.

The desorption with a component stream of the crude gas has the following advantages over a desorption with steam or inert gas, which in principle can likewise be carried out:

(1) With dry crude gas, the equipment can be made of iron and no particular problems as regards corrosion arise.

(2) In contrast to a steam desorption, no undesired waste waters are formed.

(3) With the initial purification of the crude gas, the phosgene concentration is also increased by the adsorption carbon. This is liberated again in the desorption. If crude gas is used for the desorption, this can be resupplied to the original crude gas after having been cooled and freed from the desorbate. When using other desorption gases, in the event of supplying the desorption gas freed from the desorbate to the crude gas, the latter would be diluted in undesirable manner. However, if it is desired to avoid the addition to the crude gas, a special arrangement must be set up for destroying the phosgene.

The invention is further illustrated with reference to FIGURE 1:

Through a pipe 1, the system is charged with crude gas, which contains volatile organic and inorganic impurities in addition to HCl and phosgene. Of two initial purification towers A and B which are filled with active carbon, one tower is in operation and the other is switched over for regeneration. When tower A is used as initial purifier, the gas enters by way of the opened valve $a$ by way of a pipe 2 and leaves the apparatus through a valve $a''$ by way of a pipe 10. The tower B which is under regeneration is charged through a valve $b$ which is only slightly open and by way of a pipe 3, since the gas stream for the purification represents only a fraction of the total stream and is heated by suitable means (e.g. steam heating) to about 150 to about 250° C.

The gas charged with the desorbed impurities leaves the tower by way of a valve $b'$ in a pipe 4, which opens into a pipe 6. This latter pipe leads to a gas condenser C, in which most of the desorbate is condensed, while the gas is supplied through a pipe 8 to a fan D which returns it through a pipe 9 into the pipe 7. With the switching over of the containers from B to A, the valves are appropriately adjusted. Thus the crude gas flows through pipe 3 into the tower B and leaves it through pipe 11, while the regeneration gases flow through the pipe 5 into the pipe 6. The initially purified hydrogen chloride gases flowing in a pipe 12 into adiabatic absorption tower E are sprinkled with water through pipe 13. A substantially 30% hydrochloric acid leaves the tower through a pipe 14. The inert gases and the phosgene (30 to 80% of the phosgene crude gas content) leaves the tower E with the steam formed through a pipe 16 and are brought in a preheater E' to a temperature above the dew point (95 to 120° C.). Through a pipe 16', this gas mixture now enters an active carbon reactor F, in which the reaction is completed in accordance with the equation

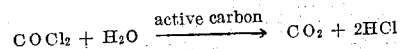

$$COCl_2 + H_2O \xrightarrow{\text{active carbon}} CO_2 + 2HCl$$

The final temperature being adjusted with the phosgene hydrolysis on active carbon depends on the ratio between steam and phosgene and can be between 120 to about 400° C. or even higher.

The dephosgenated gas containing hydrogen chloride is now condensed in a gas condenser G, which it reaches by way of a pipe 17, and flows through pipe 18 into a receiver H. The acid which is formed can be drawn off through a pipe 20 and either used as such or again fed to the tower E by means of a pump (not shown) at a position suitable for this purpose, e.g. pipe 15. Any possibly settling impurities can be drawn off through a pipe 21. The cold gas, which consists mainly of $CO_2$ and inert gases, is supplied by way of a pipe 19 and a waste gas scrubber to a chimney. With high phosgene contents, such a quantity of water is injected through a pipe 22 for complete precipitation in the condenser G of the hydrogen chloride formed by the hydrolysis that the acid discharging from the receiver H by way of a pipe 20 is about 30%.

If the pure acid in the gas condenser G shall not be recovered, the initial purification can be excluded, this being achieved by direct passage from pipe 1 to pipe 12. In this case, very volatile substances which are in the crude gas and which are insoluble in hydrochloric acid are deposited in the receiver H and can be extracted therefrom. The acid forming at H can be worked up directly in the tower E. If the proportions of phosgene in the crude gas is low and the acid thereby formed in H is very dilute, it can be admixed with the water in the pipe 13. Therefore in no case is any waste water formed.

The following examples are given for the purpose of illustration the parts being by weight unless otherwise specified.

Example 1

In an experiment carried out continuously for about six weeks, about 22 to 25 cubic meters per hour (at N.T.P.) of a crude gas having the following composition (percent by volume):

(1) about 90 to 97% of hydrogen chloride
(2) about 1 to 5% of phosgene
(3) about 1 to 3% of carbon dioxide
(4) about 0.01 to 0.1% of carbon monoxide
(5) about 0.01 to 0.1% of carbon oxysulphide
(6) about 1% of air
(7) about 0.01 to 0.05% of carbon tetrachloride
(8) about 0.01 to 0.03% of 1,2-dichlorobenzene were conducted at room temperature over about 10 liters of dry steam adsorption carbon (tower A, see FIG. 1) and freed from 1,2-dichlorobenzene. Under the aforesaid conditions and with a flow velocity of 20 cm. per second, the charging capacity of the carbon for 1,2-dichlorobenzene was about 200 g. for each liter of active carbon. After about 24 hours, the gas stream was switched over to a second adsorber (tower B) with about 10 liters of steam adsorption carbon and the tower A was charged at about 200° C. with about 2 to 4 cubic meters per hour of the same crude gas within 3 to 5 hours to up to about 90% of 1,2-dichlorobenzene, which was precipitated in a gas condenser. The gas stream thus substantially freed from 1,2-dichlorobenzene was thereafter supplied to the main gas stream. After another about 24 hours, the flow was again switched over to tower A and tower B was regenerated. The initially purified hydrogen chloride gas was then divided and conducted to two adiabatic absorption towers, which were connected with one another. The first tower was charged from below with about 15.5 cubic meters per hour (at N.T.P.) of hydrogen chloride gas and simultaneously sprinkled from above with about 150 liters of about 20% HCl at a temperature of about 60° C. About 150 liters of 30% hydrochloric acid left the bottom of this tower at a temperature of about 80 to about 90° C. The waste gas of the first tower, which consisted of excess HCl, phosgene, steam and inert gases, was supplied to approximately the middle of the second tower. This tower was charged from below with 7 cubic meters per hour (at N.T.P) of HCl crude gas and sprinkled from above with about 40 liters per hour of water. This tower likewise produced about 40 liters per hour of 30% HCl at a temperature of about 80 to about 90° C. The residual gas of the second tower consisted of about 10 kg. of steam with about 30 to 80% of the phosgene originally present in the crude gas. The missing part had already been destroyed in the adiabatic absorption.

The vapors discharging from the second tower were preheated in a preheater to about 95 to about 120° C. and thereafter conducted over about 15 liters of granulated active carbon (activated with zinc chloride solution), and a temperature of about 230 to about 250° C. was adjusted by means of the heat of hydrolysis e.g. with an initial concentration of 3% by volume of phosgene in the hydrogen chloride gas.

The acid subsequently precipitated in the gas condenser was very pure and the concentration fluctuated between 10 and more than 30%. A 20% acid was obtained if, with high initial phosgene concentrations in the gas condenser, corresponding quantities of water were sprayed in and, with low initial phosgene concentrations, the second tower was sprinkled with correspondingly less water. The 20% acid was also fed in the first tower, so that the total quantity of hydrogen chloride introduced was recovered in the form of 30% hydrochloric acid.

Carbon dioxide with traces of carbon monoxide, carbon oxysulphide, hydrogen sulphide, air and carbon tetrachloride left the gas condenser as residual gases. No phosgene could be detected in the waste gas, even after about six weeks.

Example 2

The same procedure as in Example 1 was adopted, without freeing the crude gas from the 1,2-dichlorobenzene. The 1,2-dichlorobenzene introduced was for the major part condensed with the hydrogen chloride gas in the condenser following the destruction of phosgene and could be separated as second phase from the hydrochloric acid formed. This acid was saturated with 1,2-dichlorobenzene and was supplied as in Example 1 to the first tower.

The 30% acids discharging from the towers 1 and 2 contained less than about 10 parts per million by weight of 1,2-dichlorobenzene. The residual gas leaving the gas condenser consisted of carbon dioxide with traces of carbon monoxide, carbon oxysulphide, hydrogen sulphide, air, carbon tetrachloride and 1,2-dichlorobenzene. No phosgene could be detected in the waste gas with this experiment.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the decomposition of phosgene in a mixture of waste gases with recovery of hydrochloric acid which comprises the steps of (1) contacting said mixture of waste gases containing phosgene, inert organic solvent, hydrogen chloride and inert gases with activated carbon to substantially selectively remove said inert organic solvent, (2) removing hydrogen chloride as a concentrated hydrochloric acid from the resulting mixture by adiabatic absorption with a substance selected from the group consisting of water and dilute hydrochloric acid, (3) contacting the remaining mixture containing phosgene from which solvent and hydrogen chloride have been removed under steps (1) and (2), with activated carbon at temperatures above the dew point of the mixture in the presence of water vapor and at a molar ratio of water to phosgene of 5:1 to 20:1 to form a mixture of hydrochloric acid, carbon dioxide and inert gas substantially free of phosgene and (4) cooling the resulting mixture to separate the hydrochloric acid from the carbon dioxide and inert gases.

2. The process of claim 1 wherein the concentration of the hydrochloric acid from step (4) is at least 20 percent.

3. The process of claim 1 wherein the temperature in step (3) is within the range of 120 to 400° C.

References Cited by the Examiner
UNITED STATES PATENTS

| | | | |
|---|---|---|---|
| 1,892,652 | 12/1932 | Heath | 23—154 |
| 2,402,978 | 7/1946 | Allen et al. | 23—154 |
| 2,436,432 | 2/1948 | Hunter | 23—154 |
| 2,832,670 | 4/1958 | Wollthan | 23—150 X |
| 2,950,180 | 8/1960 | Kunzer et al. | 23—154 X |
| 3,126,256 | 3/1964 | Haimsohn et al. | 23—205 |
| 3,192,128 | 6/1965 | Brandmair et al. | 23—154 X |

FOREIGN PATENTS

| | | |
|---|---|---|
| 956,608 | 4/1964 | Great Britain. |

OTHER REFERENCES

Jacobson's "Encyclopedia of Chemicals Reactions," 1948 edition, volume 2, page 343. Reinhold Pub. Corp., New York.

MILTON WEISSMAN, *Primary Examiner.*

EDWARD STERN, OSCAR R. VERTIZ, *Examiners.*